United States Patent
Marcjan et al.

(10) Patent No.: US 12,512,193 B2
(45) Date of Patent: Dec. 30, 2025

(54) SYSTEMS AND METHODS FOR DATA NORMALIZATION

(71) Applicant: Truveta, Inc., Bellevue, WA (US)

(72) Inventors: Cezary Antoni Marcjan, Redmond, WA (US); Srinivas R. Burugapalli, Sammamish, WA (US); Nishant Gopalakrishnan, Kirkland, WA (US); Jayaram Nanduri, Issaquah, WA (US); Saman Zarandioon, Seattle, WA (US); Senthil Nachimuthu, Salt Lake City, UT (US); Swarna Subash, Bellevue, WA (US); Wing Tsui, Bellevue, WA (US); Patricia Cuplin, Brier, WA (US); Ramesh Kolavennu, Sammamish, WA (US); Mehrdad Biglari, Sammamish, WA (US)

(73) Assignee: Truveta, Inc., Bellevue, WA (US)

(*) Notice: Subject to any disclaimer, the term of this patent is extended or adjusted under 35 U.S.C. 154(b) by 212 days.

(21) Appl. No.: 18/053,654

(22) Filed: Nov. 8, 2022

(65) Prior Publication Data
US 2023/0147366 A1    May 11, 2023

Related U.S. Application Data

(60) Provisional application No. 63/263,735, filed on Nov. 8, 2021.

(51) Int. Cl.
*G16H 10/60*    (2018.01)
*G06F 16/21*    (2019.01)
(Continued)

(52) U.S. Cl.
CPC .......... *G16H 10/60* (2018.01); *G06F 16/212* (2019.01); *G06F 21/6254* (2013.01); *G06Q 40/08* (2013.01)

(58) Field of Classification Search
CPC ........ G16H 10/60; G16H 10/20; G16H 70/00; G16H 70/40; G16H 15/00; G06F 40/30;
(Continued)

(56) References Cited

U.S. PATENT DOCUMENTS 7,428,494 B2 *    9/2008    Hasan .................... G06Q 40/08
                                                               705/2
7,827,234 B2      11/2010    Eisenberger et al.
(Continued)

FOREIGN PATENT DOCUMENTS

CA           2418239 C        7/2004
CN           101194255 B  *   6/2011  ............... C07H 3/02
(Continued)

OTHER PUBLICATIONS

International Search Report and Written Opinion mailed Mar. 13, 2023, International Application No. PCT/US2022/079476, 13 pages.
(Continued)

*Primary Examiner* — Kyung H Shin
(74) *Attorney, Agent, or Firm* — FORTEM IP LLP

(57) ABSTRACT

Systems and methods for data normalization are disclosed. The disclosed systems and methods train one or more machine learning model based on a plurality of annotated records and apply these trained models to new or updated records. The models are configured to analyze the records and generate classifications or concepts from the records and corresponding confidence scores. If the confidence scores exceed a threshold, the corresponding classifications or concepts are appended to the appropriate record.

20 Claims, 8 Drawing Sheets

TRUVETA DATA NORMALIZATION PROCESS

(51) Int. Cl.
 *G06F 21/62* (2013.01)
 *G06Q 40/08* (2012.01)
(58) Field of Classification Search
 CPC ...... G06F 40/274; G06F 40/295; G06F 16/35;
  G06F 16/353; G06F 16/93; G06F 16/212;
  G06F 16/25; G06F 16/908; G06F 16/86;
  G06F 16/835; G06Q 40/08
 See application file for complete search history.

(56) References Cited

U.S. PATENT DOCUMENTS

| | | | |
|---|---|---|---|
| 10,534,816 B2 | 1/2020 | Gilder et al. | |
| 10,657,613 B2 | 5/2020 | Bucur et al. | |
| 11,151,125 B1 | 10/2021 | Dwivedi et al. | |
| 12,057,208 B1 | 8/2024 | Esman | |
| 12,086,287 B2 | 9/2024 | Jensen et al. | |
| 2008/0306872 A1 | 12/2008 | Felsher | |
| 2009/0030290 A1 | 1/2009 | Kozuch et al. | |
| 2010/0077006 A1 | 3/2010 | El et al. | |
| 2012/0046969 A1 | 2/2012 | Schoenberg | |
| 2014/0257045 A1 | 9/2014 | Hu et al. | |
| 2014/0330578 A1 | 11/2014 | Pincus | |
| 2016/0147945 A1 | 5/2016 | MacCarthy et al. | |
| 2016/0154978 A1 | 6/2016 | Baker et al. | |
| 2016/0210427 A1 | 7/2016 | Mynhier et al. | |
| 2017/0103232 A1 | 4/2017 | Scaiano et al. | |
| 2017/0161439 A1 | 6/2017 | Raduchel et al. | |
| 2018/0089382 A1 | 3/2018 | Allen et al. | |
| 2018/0158552 A1 | 6/2018 | Liu et al. | |
| 2018/0322946 A1 | 11/2018 | Ika et al. | |
| 2019/0034590 A1 | 1/2019 | Oren et al. | |
| 2019/0034591 A1 | 1/2019 | Mossin et al. | |
| 2019/0057774 A1 | 2/2019 | Velez et al. | |
| 2019/0095478 A1 | 3/2019 | Tankersley et al. | |
| 2019/0371475 A1 | 12/2019 | Oliveira et al. | |
| 2020/0176098 A1* | 6/2020 | Lucas | G16H 10/60 |
| 2022/0129584 A1 | 4/2022 | Blackport et al. | |
| 2022/0171747 A1* | 6/2022 | Rajyaguru | G06F 16/212 |
| 2022/0222374 A1 | 7/2022 | Antoniou et al. | |
| 2023/0144503 A1 | 5/2023 | Powers et al. | |
| 2023/0148326 A1 | 5/2023 | Papel et al. | |
| 2023/0162825 A1 | 5/2023 | Nanduri et al. | |
| 2024/0087687 A1 | 3/2024 | Marcjan et al. | |
| 2024/0370404 A1 | 11/2024 | Burugapalli et al. | |
| 2024/0412830 A1 | 12/2024 | Marcjan et al. | |
| 2025/0232063 A1 | 7/2025 | Shinn et al. | |

FOREIGN PATENT DOCUMENTS

| | | |
|---|---|---|
| EP | 1994484 B1 | 3/2015 |
| WO | 2007084502 A1 | 7/2007 |
| WO | 2023081909 A1 | 5/2023 |
| WO | 2023081912 A1 | 5/2023 |
| WO | 2023081919 A1 | 5/2023 |
| WO | 2023081921 A8 | 11/2023 |

OTHER PUBLICATIONS

Ahmad, Arab, et al., "MDMP: A new algorithm to create inverted index files in BigData, using MapReduce", 2017 7th International Conference on Computer and Knowledge Engineering (ICCKE), IEEE, Oct. 26, 2017 (Oct. 26, 2017), pp. 372-378.

Garfinkel, Simson L., "De-identification of personal information NIST IR 8053", NIST, National Institute of Standards and Technology (NIST), Oct. 21, 2015 (Oct. 21, 2015), pp. 1-54, XP061056032, DOI: 10.6028/NIST.IR.8053.

Sweeney, Latanya, "k-anonymity: a model for protecting privacy k-Anonymity: A Model for Protecting Privacy 1", International Journal on Uncertainty, Oct. 31, 2002 (Oct. 31, 2002), pp. 557-570, XP055268614, URL:https://epic.org/privacy/reidentificat ion/ Sweeney Article.pdf [retrieved on Apr. 26, 2016].

Taneja, Himanshu, et al., "Preserving Privacy of Patients Based on Re-identification Risk", Procedia Computer Science, Elsevier, Amsterdam, NL, vol. 70, Nov. 21, 2015, pp. 448-454, XP029309606, ISSN: 187.7-0509, DOI: 10.1016/J.PROCS.2015.10.073.

Uwe, Roth, "A Generalized View on Pseudonyms and Domain Specific Local Identifiers. Lessons Learned from Various Use Cases", The International Journal on Advances in Security, vol. 7, No. 3-4, Dec. 31, 2014 (Dec. 31, 2014), pp. 76-92, XP093019165, ISSN: 1942-2636.

Bodenreider et al., Comparing the Representation of Anatomy in the FMA and SNOMED CT, AMIA 2006 Symposium Proceeding, pp. 46-50.

Devlin, Jacob et al., BERT: Pre-training of Deep Bidirectional Transformers for Language Understanding, Proceedings of NAACL-HLT 2019, pp. 4171-4186.

Jimenez-Ruiz et al., Logic-based assessment of the compatibility of UMLS ontology sources, Journal of Biomedical Semantics, 2011, 2(Suppl 1): S2.

Luong et al., Multi-Task Sequence to Sequence Learning, published as a conference paper at ICLR, 2016, 10 pages.

Xue, Linting et al., ByT5: Towards a Token-Free Future with Pre-trained Byte-to-Byte Models, endeavarXiv:2105.13626v3 [cs.CL] Mar. 8, 2022, 16 pages.

Xue, Linting et al., mT5: A Massively Multilingual Pre-trained Text-to-Text Transformer, arXiv:2010.11934v3 [cs.CL] Mar. 11, 2021, 17 pages.

\* cited by examiner

SYSTEMS AND METHODS FOR DATA NORMALIZATION

RELATED APPLICATIONS

This application claims the benefit of U.S. Provisional Patent Application No. 63/263,735, entitled "SYSTEMS AND METHODS FOR DATA NORMALIZATION," filed on Nov. 8, 2021, which is herein incorporated by reference in its entirety. This application is related to U.S. Provisional Patent Application No. 63/263,725, entitled HEALTH DATA PLATFORM AND ASSOCIATED METHODS, filed on Nov. 8, 2021, U.S. Provisional Patent Application No. 63/263,733, entitled "SYSTEMS AND METHODS FOR INDEXING AND SEARCHING HEALTH DATA," filed on Nov. 8, 2021, U.S. Provisional Patent Application No. 63/263,731, entitled "SYSTEMS AND METHODS FOR DE-IDENTIFYING PATIENT DATA," filed on Nov. 8, 2021, U.S. Provisional Patent Application No. 63/268,995, entitled "SYSTEMS AND METHODS FOR INDEXING AND SEARCHING HEALTH DATA," filed on Mar 8, 2022, U.S. Provisional Patent Application No. 63/268,993, entitled "SYSTEMS AND METHODS FOR QUERYING HEALTH DATA," filed on Mar. 8, 2022, U.S. patent application Ser. No. 18/053,504, entitled "HEALTH DATA PLATFORM AND ASSOCIATED METHODS," filed on Nov. 8, 2022, U.S. patent application Ser. No. 18/053,540, entitled "SYSTEMS AND METHODS FOR INDEXING AND SEARCHING HEALTH DATA," filed on Nov. 8, 2022, and U.S. patent application Ser. No. 18/053,643, entitled "SYSTEMS AND METHODS FOR DE-IDENTIFYING PATIENT DATA," filed on Nov. 8, 2022, each of which is herein incorporated by reference in its entirety.

TECHNICAL FIELD

The present technology generally relates to healthcare, and in particular, to systems and methods for data normalization.

BACKGROUND

Medical research has come a long way since paper records were digitized. Researchers now have access to more health data than ever before. But limitations persist. Research is still often conducted on relatively small data sets that may be weeks or even months old and not represent the full diversity of a population. This can result in biased insights that can compromise patient care.

Healthcare entities such as hospitals, clinics, and laboratories produce enormous volumes of health data. This health data can provide valuable insights for research and improving patient care. However, the patient records and other health data received from health system members can arrive from different databases in multiple formats, often incorporating a wide variety of terminologies and medical code sets. The structure of these records can also vary widely. Additionally, even with standard medical terminology, the way in which that terminology is used can also vary widely. A heart attack in one record, for example, may be described as acute myocardial infarction or AMI in another. All of these different structures, terminologies, and semantics can make it difficult to work across heath data records and identify meaningful trends and insights. There has been much progress made to arrive at a set of standards and processes that can help address this inconsistency, but the larger and more diverse the dataset, the more complex and time consuming the processing.

The HIPAA Privacy Rule does not restrict the use or disclosure of de-identified health information—health information that neither identifies nor provides a reasonable basis for identifying a patient or individual. However, conventional techniques for de-identifying health data may remove too much information from the patient record, resulting in data that has limited utility for subsequent applications. Additionally, conventional de-identification techniques may not be well-suited for handling patient data that is received at different times or from different health systems because, for example, they are not stored in a uniform format. Accordingly, improved systems and methods for de-identifying patient data are needed.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

Figure 1A:
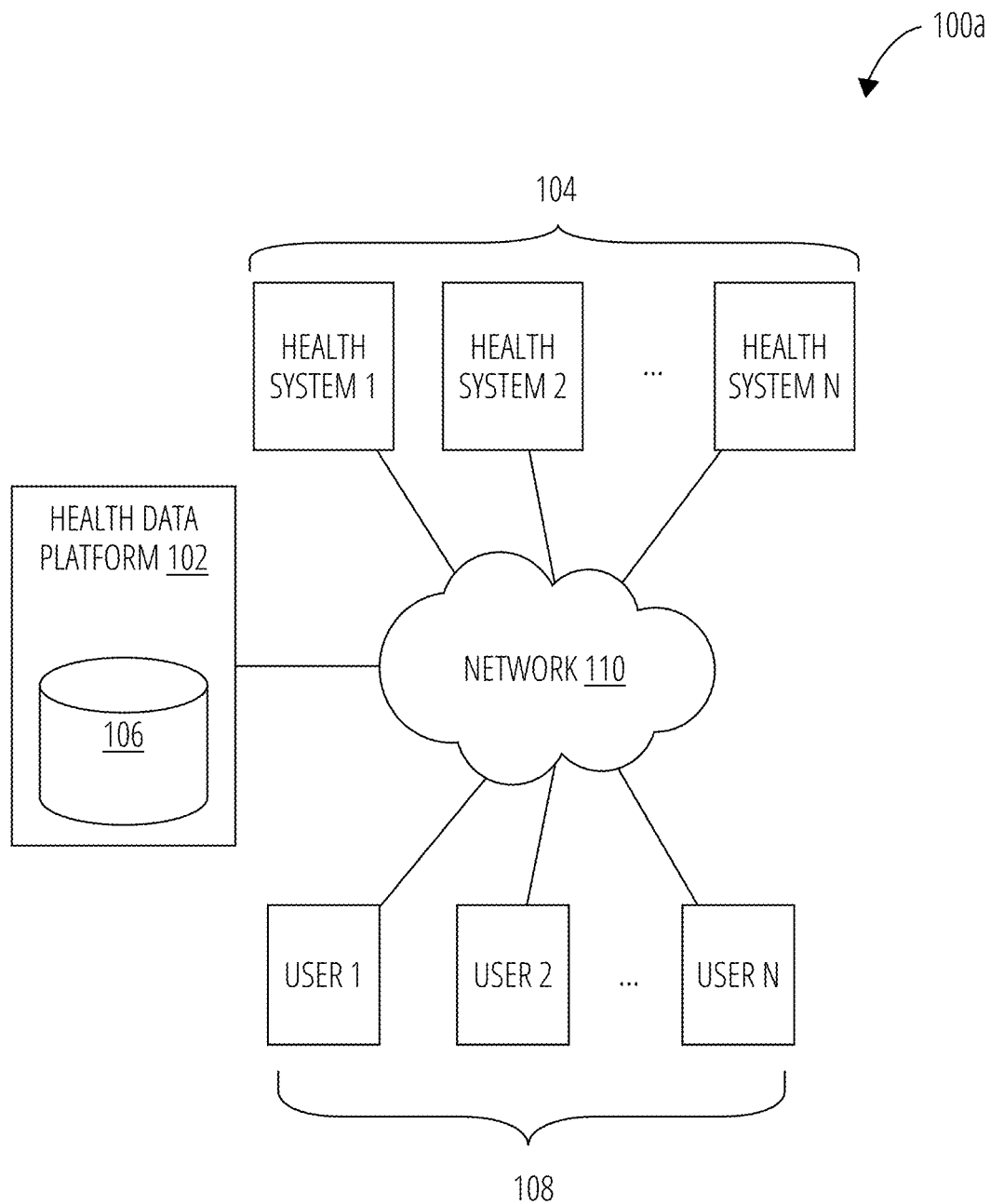
FIG. 1A is a schematic diagram of a computing environment in which a health data platform can operate, in accordance with embodiments of the present technology.

The present technology relates to systems and methods for data normalization. In some embodiments, a health data platform is configured to consolidate multiple and disparate data streams into a common data model for effective research. For example, the health data platform can interface with health system members providing more than 16% of care in the United States in tens of thousands of clinical care sites in 42 states, representing the full diversity of the country across age, geography, race, ethnicity, and gender. Billions of clinical data points from this care can be brought together in the health data platform to enable research on any drug, disease, or device across the full diversity of the United States. The health data platform can assemble millions of patient records from multiple health provider members. In some embodiments, data flows into the system daily, providing researchers with virtually real time updates. However, the speed, volume, and diversity of this data can pose significant management challenges. For example, the data received from the health system members can include all Electronic Health Record (EHR) data, such as labs, vitals, diagnosis codes, procedure codes, physician notes, imaging reports, pathology reports, images, and/or genomics information. The structure of these records can vary widely, as well as the terminology used in the records. Accordingly, there is a need for systems and methods that can make sense of a large and diverse flow of health data without compromising the diversity and accuracy of that data, or the speed of its delivery for research and/or other purposes.

The present technology provides a process for making data useful from health system members, referred to herein as "normalization." Data normalization can refer to the practice of converting a diverse flow of data into a unified and consistent data model. Conventionally, the task of interpreting health data and mapping to standard models is done by an expert team of annotators, informaticists, and other clinical experts. Given the size and speed of the data flow that health data platform manages, this process is not practical or scalable. Instead, the present technology provides a unique system that combines artificial intelligence (AI), machine learning, and natural language processing with expert analysis. In this way, the present technology can automate much of the normalization process at massive scale while leveraging clinical experts to monitor, update and evolve the system.

In some embodiments, the disclosed techniques provide a network-based patient data management method that acquires, aggregates, and normalizes patient information from various sources into a uniform or common format, stores the aggregated patient information, and notifies health care providers and/or patients after information is updated via one or more communication channels. In some cases, the acquired patient information may be provided by one or more users through an interface, such as a graphical user interface, that provides remote access to users over a network so that any one or more of the users can provide at least one updated patient record in real time, such as a patient record in a format other than the uniform or common format, including formats that are dependent on a hardware and/or software platform used by a user providing the patient information.

In some embodiments, the disclosed techniques employ a data catalog that facilitates data governance and analyzing and adding records to a repository. The data catalog can capture metadata for multi-modal data, thereby providing a single place to track data in the system. Furthermore, metadata driven transforms provide for data normalization that allows data modelers and analysts to work independent of target data platform where data is processed. Metadata driven processing improves consistency, debugging and reduces maintenance while capturing data lineage. Metrics and alerts related to any data and quality of data can be authored and persisted in data catalog while schema and transforms can be versioned, ensuring backward compatibility.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The headings provided herein are for convenience only and do not interpret the scope or meaning of the claimed present technology. Embodiments under any one heading may be used in conjunction with embodiments under any other heading.

I. Health Data Platform

Figure 1B:
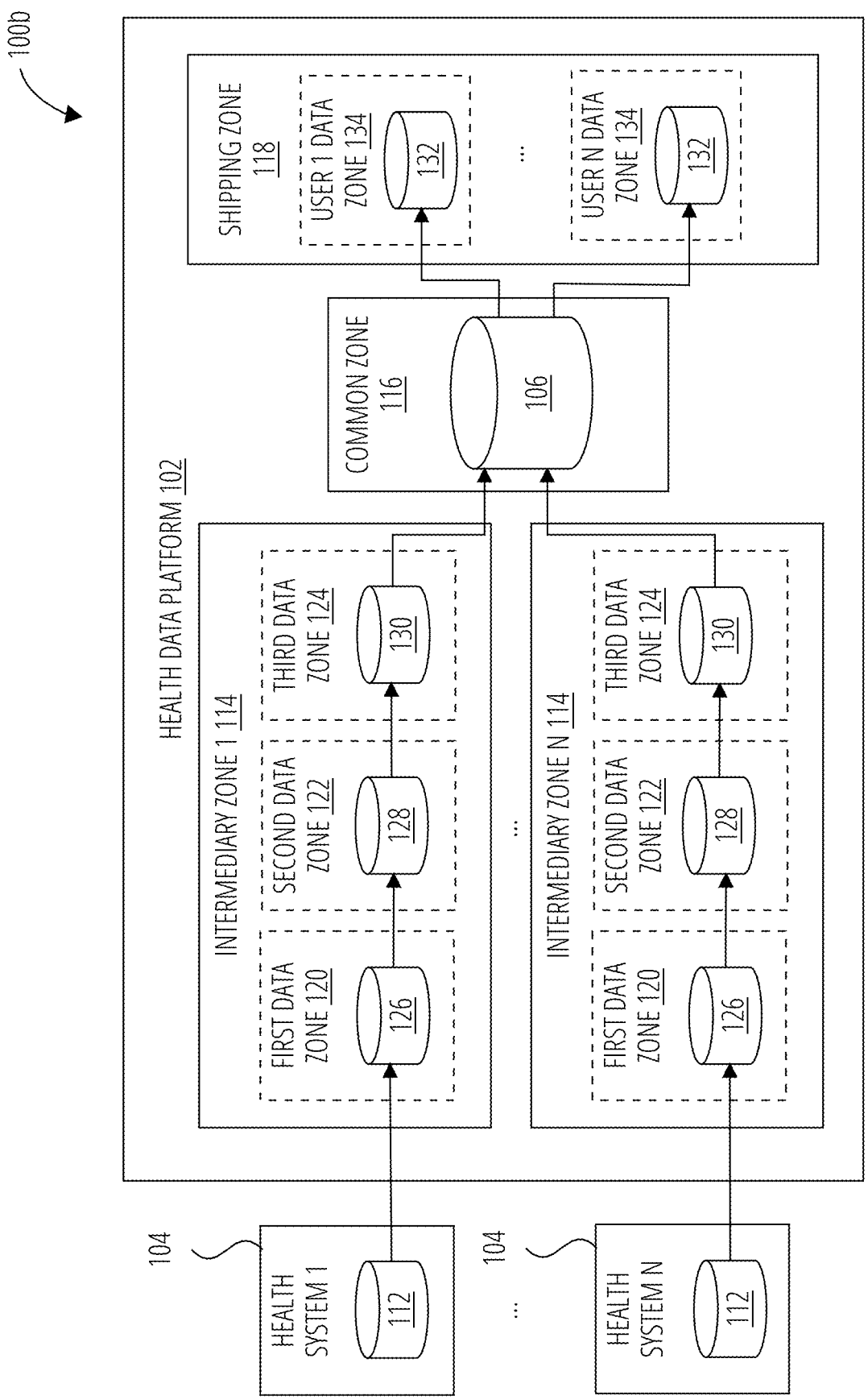
FIG. 1B is a schematic diagram of a data architecture that can be implemented by a health data platform, in accordance with embodiments of the present technology.

FIGS. 1A and 1B provide a general overview of a health data platform configured in accordance with embodiments of the present technology. Specifically, FIG. 1A is a schematic diagram of a computing environment 100a in which a health data platform 102 can operate, and FIG. 1B is a schematic diagram of a data architecture 100b that can be implemented by the health data platform 102.

Referring first to FIG. 1A, the health data platform 102 is configured to receive health data from a plurality of health systems 104, aggregate the health data into a common data repository 106, and allow one or more users 108 to access the health data stored in the common data repository 106. As described in further detail below, the common data repository 106 can store health data from multiple different health systems 104 and/or other data sources in a uniform schema, thus allowing for rapid and convenient searching, analytics, modeling, and/or other applications that would benefit from access to large volumes of health data.

The health data platform 102 can be implemented by one or more computing systems or devices having software and hardware components (e.g., processors, memory) configured to perform the various operations described herein. For example, the health data platform 102 can be implemented as a distributed "cloud" server across any suitable combination of hardware and/or virtual computing resources. The health data platform 102 can communicate with the health system 104 and/or the users 108 via a network 110. The network 110 can be or include one or more communications networks, such as any of the following: a wired network, a wireless network, a metropolitan area network (MAN), a local area network (LAN), a wide area network (WAN), a virtual local area network (VLAN), an internet, an extranet, an intranet, and/or any other suitable type of network or combinations thereof.

The health data platform 102 can be configured to receive and process many different types of health data, such as patient data. Examples of patient data include, but are not limited to, any of the following: age, gender, height, weight, demographics, symptoms (e.g., types and dates of symptoms), diagnoses (e.g., types of diseases or conditions, date of diagnosis), medications (e.g., type, formulation, prescribed dose, actual dose taken, timing, dispensation records), treatment history (e.g., types and dates of treatment procedures, the healthcare facility or provider that administered the treatment), vitals (e.g., body temperature, pulse rate, respiration rate, blood pressure), laboratory measurements (e.g., complete blood count, metabolic panel, lipid panel, thyroid panel, disease biomarker levels), test results (e.g., biopsy results, microbiology culture results), genetic data, diagnostic imaging data (e.g., X-ray, ultrasound, MRI, CT), clinical notes and/or observations, other medical history (e.g., immunization records, death records), insurance information, personal information (e.g., name, date of birth, social security number (SSN), address), familial medical history, and/or any other suitable data relevant to a patient's health. In some embodiments, the patient data is provided in the form of electronic health record (EHR) data, such as structured EHR data (e.g., schematized tables representing orders, results, problem lists, procedures, observations, vitals, microbiology, death records, pharmacy dispensation records, lab values, medications, allergies, etc.) and/or unstructured EHR data (e.g., patient records including clinical notes, pathology reports, imaging reports, etc.). A set of patient data relating to the health of an individual patient may be referred to herein as a "patient record."

The health data platform 102 can receive and process patient data for an extremely large number of patients, such as thousands, tens of thousands, hundreds of thousands, millions, tens of millions, or hundreds of millions of patients. The patient data can be received continuously, at predetermined intervals (e.g., hourly, daily, weekly, monthly), when updated patient data is available and/or pushed to the health data platform 102, in response to requests sent by the health data platform 102, or suitable combinations thereof. Thus, due to the volume and complexity of the patient data involved, many of the operations performed by the health data platform 102 are impractical or impossible for manual implementation.

Optionally, the health data platform 102 can also receive and process other types of health data. For example, the health data can also include facility and provider information (e.g., names and locations of healthcare facilities and/or providers), performance metrics for facilities and providers (e.g., bed utilization, complication rates, mortality rates, patient satisfaction), hospital formularies, health insurance claims data (e.g., 835 claims, 837 claims), supply chain data (e.g., information regarding suppliers of medical devices and/or medications), device data (e.g., device settings, indications for use, manufacturer information, safety data), health information exchanges and patient registries (e.g., immunization registries, disease registries), research data, regulatory data, and/or any other suitable data relevant to healthcare. The additional health data can be received continuously, at predetermined intervals (e.g., hourly, daily, weekly, monthly), as updated data is available, upon request by the health data platform 102, or suitable combinations thereof.

The health data platform 102 can receive patient data and/or other health data from one or more health systems 104. Each health system 104 can be an organization, entity, institution, etc., that provides healthcare services to patients. A health system 104 can optionally be composed of a plurality of smaller administrative units (e.g., hospitals, clinics, labs, or groupings thereof), also referred to herein as "care sites." The health data platform 102 can receive data from any suitable number of health systems 104, such as one, two, four, five, ten, fifteen, twenty, thirty, forty, fifty, hundreds, thousands, or more different health systems 104. Each health system 104 can include or otherwise be associated with at least one computing system or device (e.g., a server) that communicates with the health data platform 102 to transmit health data thereto. For example, each health system 104 can generate patient data for patients receiving services from the respective health system 104, and can transmit the patient data to the health data platform 102. As another example, each health system 104 can generate operational data relating to the performance metrics of the care sites within the respective health system 104, and can transmit the operational data to the health data platform 102.

Optionally, the health data platform 102 can receive health data from other data sources besides the health systems 104. For example, the health data platform 102 can receive health data from one or more databases, such as public or licensed databases on drugs, diseases, medical ontologies, demographics and/or other patient data, etc. (e.g., SNOMED CT, RxNorm, ICD-10, FHIR, LOINC, UMLS, OMOP, LexisNexis, state vaccine registries). In some embodiments, this additional health data provides metadata that is used to process, analyze, and/or enhance patient data received from the health systems 104, as described below.

The health data platform 102 can perform various data processing operations on the received health data, such as de-identifying health data that includes patient identifiers, converting the health data from a health system-specific format into a uniform format, and/or enhancing the health data with additional data. Subsequently, the health data platform 102 can aggregate the processed health data in the common data repository 106. The common data repository 106 can be or include one or more databases configured to store health data from multiple health systems 104 and/or other data sources. The health data in the common data repository 106 can be in a uniform schema or format to facilitate downstream applications. For example, the health data platform 102 performs additional data processing operations on the health data in the common data repository 106, such as analyzing the health data (e.g., using machine learning models and/or other techniques), indexing or otherwise preparing the health data for search and/or other applications, updating the health data as additional data is received, and/or preparing the health data for access by third parties (e.g., by performing further de-identification processes). Additional details of some of the operations that can be performed by the health data platform 102 are described below with respect to FIG. 1B.

The health data platform 102 can allow one or more users 108 (e.g., researchers, healthcare professionals, health system administrators) to access the aggregated health data stored in the common data repository 106. Each user 108 can communicate with the health data platform 102 via a computing device (e.g., personal computer, laptop, mobile device, tablet computer) and the network 110. For example, a user 108 can send a request to the health data platform 102 to retrieve a desired data set, such as data for a population of patients meeting one or more conditions (e.g., diagnosed with a particular disease, receiving particular medication, belonging to a particular demographic group). The health data platform 102 can search the common data repository 106 to identify a subset of the stored health data that fulfills the requested conditions, and can provide the identified subset to the user 108. Optionally, the health data platform 102 can perform additional operations on the identified subset of health data before providing the data to the user, such as de-identification and/or other processes to ensure data security and patient privacy protection.

FIG. 1B illustrates the data architecture 100b of the health data platform 102, in accordance with embodiments of the present technology. The health data platform 102 can be subdivided into a plurality of discrete data handling zones, also referred to herein as "zones" or "domains." Each zone is configured to perform specified data processing operations and store the data resulting from such operations. For example, in the illustrated embodiment, the health data platform 102 includes a plurality of intermediary zones 114 (also known as "embassies") that receive and process health data from the health systems 104, a common zone 116 that aggregates the data from the intermediary zones 114 in the common data repository 106, and a shipping zone 118 that provides selected data for user access. Each zone can include access controls, security policies, privacy rules, and/or other measures that define data isolation boundaries tailored to the sensitivity level of the data contained within that zone. The flow of data between zones can also be strictly controlled to mitigate the risk of privacy breaches and/or other data security risks.

In the illustrated embodiment, each of the health systems 104 includes at least one health system database 112. The health system database 112 can store health data produced by the respective health system 104, such as patient data for the patients receiving healthcare services from the health system 104, operational data for the health system 104, etc. The patient data stored in the health system database 112 can include or be associated with identifiers such as the patient's name, address (e.g., street address, city, county, zip code), relevant dates (e.g., date of birth, date of death, admission date, discharge date), phone number, fax number, email address, SSN, medical record number, health insurance beneficiary number, account number, certificate or license number, vehicle identifiers and/or serial numbers (e.g., license plate numbers), device identifiers and/or serial numbers, web URL, IP address, finger and/or voice prints, photographic images, and/or any other characteristic or information that could uniquely identify the patient. Accordingly, the patient data can be considered to be PHI (e.g., electronic PHI (ePHI)), which may be subject to strict regulations on disclosure and use.

As shown in FIG. 1B, health data can be transmitted from the health systems 104 to the health data platform 102 via respective secure channels and/or over a communications network (e.g., the network 110 of FIG. 1A). The health data can be transmitted continuously, at predetermined intervals, in response to pull requests from the health data platform 102, when the health systems 104 push data to the health data platform 102, or suitable combinations thereof. For example, some or all of the health systems 104 can provide a daily feed of data to the health data platform 102.

The health data from the health systems 104 can be received by the intermediary zones 114 of the health data platform 102. In some embodiments, the intermediary zones 114 are configured to process the health data from the health systems 104 to prepare the data for aggregation in the common zone 116. For example, each intermediary zone 114 can de-identify the received health data to remove or otherwise obfuscate identifying information so that the health data is no longer classified as PHI and can therefore be aggregated and used in a wide variety of downstream applications (e.g., search, analysis, modeling). The intermediary zone 114 can also normalize the received health data by converting the data from a health system-specific format to a uniform format suitable for aggregation with health data from other health systems 104. As shown in FIG. 1B, each intermediary zone 114 can receive health data from a single respective health system 104. The intermediary zones 114 can be isolated from each other such that health data across different health systems 104 cannot be combined with each other or accessed by unauthorized entities (e.g., a health system 104 other than the health system 104 that originated the data) before patient identifiers have been removed.

In the illustrated embodiment, each intermediary zone 114 includes a plurality of data zones that sequentially process the health data from the respective health system 104. For example, in the illustrated embodiment, each intermediary zone 114 includes a first data zone 120 (also known as a "landing zone"), a second data zone 122 (also known as an "enhanced PHI zone"), and a third data zone 124 (also known as an "enhanced DeID zone").

As shown in FIG. 1B, the health data from each health system 104 can initially be received and processed by the first data zone 120 (landing zone). The first data zone 120 can implement one or more data ingestion processes to extract relevant data and/or filter out erroneous or irrelevant data. The data ingestion processes can be customized based on the particular health system 104, such as based on the data types and/or formats produced by the health system 104. Accordingly, the first data zones 120 within different intermediary zones 114 can implement different data ingestion processes, depending on the particular data output of the corresponding health system 104. The data resulting from the data ingestion processes can be stored in a first database 126 within the first data zone 120. The data can remain in the first database 126 indefinitely or for a limited period of time (e.g., no more than 30 days, no more than 1 year, etc.), e.g., based on the preferences of the respective health system 104, security considerations, and/or other factors. The data in the first database 126 can still be considered PHI because the patient identifiers have not yet been removed from the data. Accordingly, the first data zone 120 can be subject to relatively stringent access controls and data security measures.

The data produced by the first data zone 120 can be transferred to the second data zone 122 (enhanced PHI zone). In some embodiments, the data received from the first data zone 120 is initially in a non-uniform format, such as a format specific to the health system 104 that provided the data. Accordingly, the second data zone 122 can implement one or more data normalization processes to convert the data into a unified, normalized format or schema (e.g., a standardized data model). Optionally, data normalization can include enhancing, enriching, annotating, or otherwise supplementing the health data with additional data (e.g., health metadata received from databases and/or other data sources). Additional details of the data normalization processes disclosed herein are provided in Section II below. The data resulting from these processes can be stored in a second database 128 within the second data zone 122. The data can remain in the second database 128 indefinitely or for a limited period of time (e.g., no more than 30 days, 1 year, etc.), e.g., based on the preferences of the respective health system 104, security considerations, and/or other factors. The data stored in the second database 128 can still be considered PHI because the patient identifiers have not yet been removed from the data. Accordingly, the second data zone 122 can also be subject to relatively stringent access controls and data security measures, similar to the first data zone 120.

The data produced by the second data zone 122 can be transferred to the third data zone 124 (enhanced DeID zone). The third data zone 124 can implement one or more de-identification processes to remove and/or modify identifiers from the data so that the data is no longer classified as PHI. The de-identification processes can include, for example, modifying the data to remove, alter, coarsen, group, and/or shred patient identifiers, and/or removing or suppressing certain patient records altogether. For example, a patient record can be suppressed if the record would still potentially be identifiable even after the identifiers have been removed and/or modified (e.g., if the record shows a diagnosis of an extremely rare disease). In some embodiments, the de-identification processes also include producing tokens that allow data from the same patient to be tracked without using the original identifiers. The resulting de-identified data can be stored in a third database 130 within the third data zone 124. The data can remain in the third database 130 indefinitely or for a limited period of time (e.g., no more than 30 days, 1 year, etc.), e.g., based on the preferences of the respective health system 104, security considerations, and/or other factors. Because the data stored in the third database 130 is no longer considered PHI, the third data zone 124 can have less stringent access controls and data security measures than the first and second data zones 120, 122.

The de-identified data produced by each intermediary zone 114 can be transferred to a common zone 116 within the health data platform 102 via respective secure channels. The common zone 116 can include the common data repository 106 that stores aggregated health data from all of the health systems 104. As discussed above, the data stored in the common data repository 106 has been de-identified and/or normalized into a uniform schema, and can therefore be used in many different types of downstream applications. For example, the common zone 116 can implement processes that analyze the data in the common data repository 106 using machine learning and/or other techniques to produce various statistics, analytics (e.g., cohort analytics, time series analytics), models, knowledge graphs, etc. As another example, the common zone 116 can implement processes that index the data in the common data repository 106 to facilitate search operations.

The data stored in the common data repository 106 can be selectively transferred to the shipping zone 118 of the health data platform 102 for access by one or more users 108 (not shown in FIG. 1B). In the illustrated embodiment, the shipping zone 118 includes a plurality of user data zones 134. Each user data zone 134 can be customized for a particular user 108, and can store and expose a selected subset of data for access by that user 108. The user data zones 134 can be isolated from each other so that each user 108 can only access data within their assigned user data zone 134. The amount, type, and/or frequency of data transferred to each user data zone 134 can vary depending on the data requested by the user 108 and the risk profile of the user 108. For example, the user 108 can send a request to the health data platform 102 (e.g., via the network 110 of FIG. 1A) for access to certain data in the common data repository 106 (e.g., data for patients who have been diagnosed with a particular disease, belong to a particular population, have received a particular treatment procedure, etc.). The common zone 116 can implement a search process to identify a subset of the data in the common data repository 106 that fulfills the request parameters. Optionally, depending on the risk profile of the user 108, the common zone 116 can perform additional de-identification processes and/or apply other security measures to the identified data subset. The identified data subset can then be transferred to the user data zone 134 for access by the user 108 (e.g., via a secure channel in the network 110 of FIG. 1A).

The data architecture 100b illustrated in FIG. 1B can be configured in many different ways. For example, although the intermediary zones 114 are illustrated in FIG. 1B as having three data zones, in other embodiments, some or all of the intermediary zones 114 can include fewer or more data zones. Any of the zones illustrated in FIG. 1B can alternatively be combined with each other into a single zone, or can be subdivided into multiple zones. Any of the processes described herein as being implemented by a particular zone can instead be implemented by a different zone, or can be omitted altogether.

II. Data Normalization

The present technology provides two types of normalization for effective processing of health data. Syntactic normalization addresses structural differences in records. Semantic normalization addresses variances in terminology within that structure.

With syntactic normalization, similar fields used in electronic health records are mapped to a common schema. A patient's birth date, for example, might be in a field marked BirthDate in one record and DOB in another. The health data platform can create one field that applies to both and add this field to the common schema model. The innovative mapping application can automatically move huge volumes of data into the schema. The schema mapping can be informed by leading standards such as Fast Healthcare Interoperability Resources (FHIR®). Additionally, the health data platform can continually add to the schema model to accommodate data with unique structures while also maintaining as much uniformity across records as possible.

Figure 2:
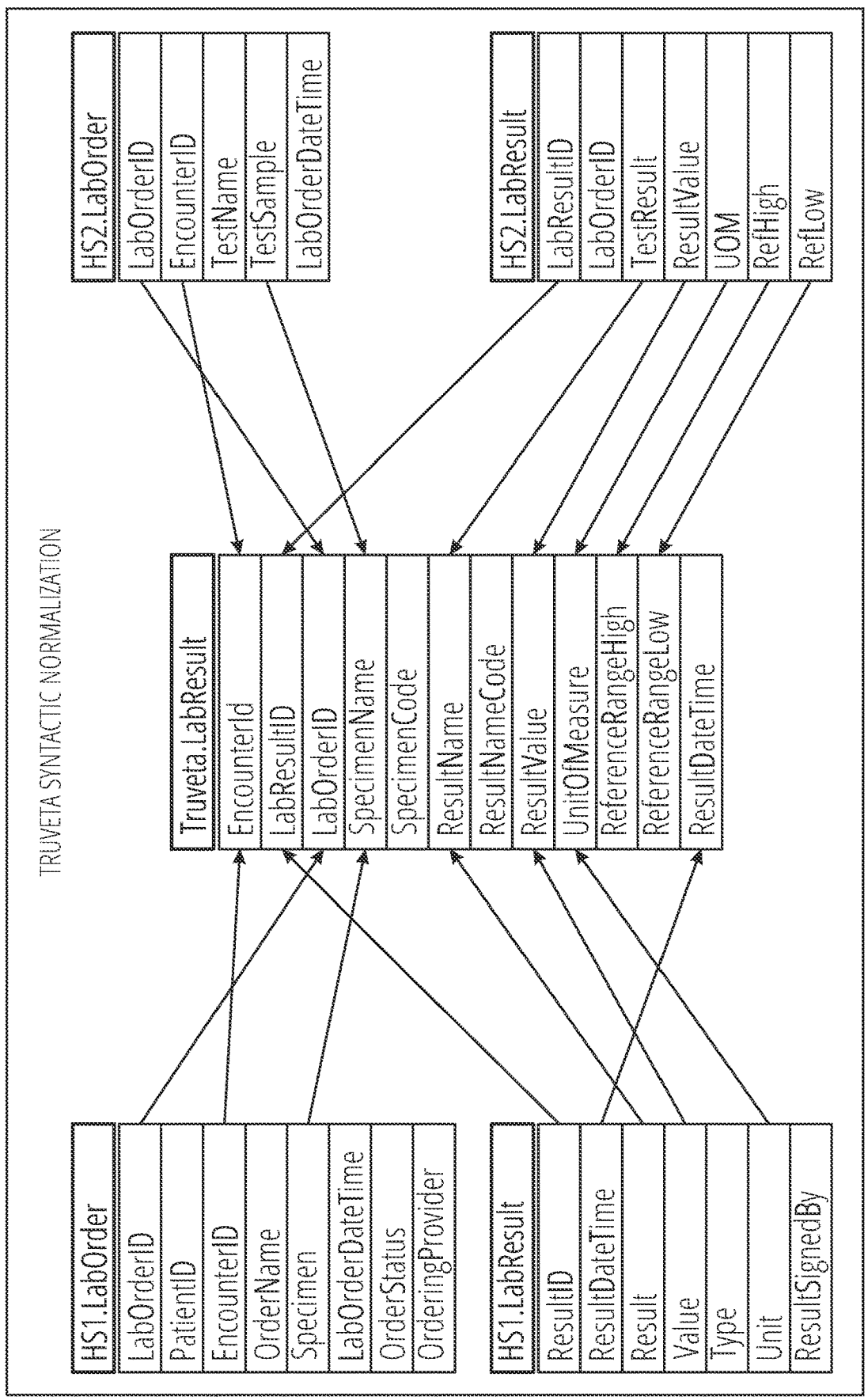
FIG. 2 illustrates an example of syntactic normalization, in accordance with embodiments of the present technology.

FIG. 2 illustrates an example showing how syntactic normalization is done for datasets from two health system members. In some cases, there are identical fields (e.g., LabOrderID) which are mapped directly to the model. In other cases, a new field is created (e.g., SpecimenName) that covers several, similarly named fields. Fields that may be redundant or have no value for clinical research may be removed from the model (e.g., ResultSignedBy) and/or new fields may be added to further clarify the model (e.g., ResultNameCode).

With the syntactic normalization process, the health data platform can also leverage AI and machine learning to scan data for certain errors and syntactic inconsistencies such as units of measurement. The system not only corrects measurements to a standard value but also alerts for measurements that fall outside of expected values. For example, a date of birth outside regular syntax might be flagged, as would a weight denoted with a negative number.

Once data has been organized into common fields and normalize syntax, the health data platform can normalize names, values, and/or other data within those fields through semantic normalization.

As with syntactic normalization, the present technology may need to create a normalization model that can standardize terminology while also maintaining as much detail as possible for research. With semantic normalization, the challenge is even more complex. In some embodiments, the model is applied to billions of observations and diagnostic values.

To build this model, leading medical ontologies are selected for each major subject area and practice domain covered in the data. These ontologies can then be combined to create a superset of ontologies in the disclosed model. These categories and related ontologies can include:

Diagnosis
  ICD-10-CM: The International Classification of Diseases and Related Health Problems (ICD) Clinical Modification is used by U.S. physicians and other healthcare providers to classify and code all diagnoses, symptoms, and problems. Like its predecessor ICD-9-CM, ICD-10-CM is published by the National Center for Health Statistics of the U.S. government.
  ICD-10-PCS. The International Classification of Diseases and Related Health Problems (ICD) Procedure Coding System is used for classifying procedures performed in hospital inpatient health care settings.
Supplies and Equipment
  HCPCS. The Healthcare Common Procedure Coding System represents medical procedures, supplies, products, and services.

Lab and Clinical Observations
  LOINC: Logical Observation Identifiers Names and Codes was created specifically to standardize the identification and reporting of medical laboratory observations, including measurements. It has been expanded to standardize clinical observations as well.
  SNOMED CT: The Systematized Nomenclature of Medicine Clinical Terms (US Edition) is used to standardize clinical findings, disorders, body structures, procedures, microorganisms, allergies, and various other clinical domains.
Medications
  NDC. The National Drug Code provides a list of all drugs manufactured or processed for off-the-shelf, commercial distribution.
  CVX. The Vaccine Administered (CVX) standard covers active and inactive vaccine terms for the US.
  RxNorm provides standard names for clinical drugs (active ingredient+strength) and for dose forms.

Figure 3:
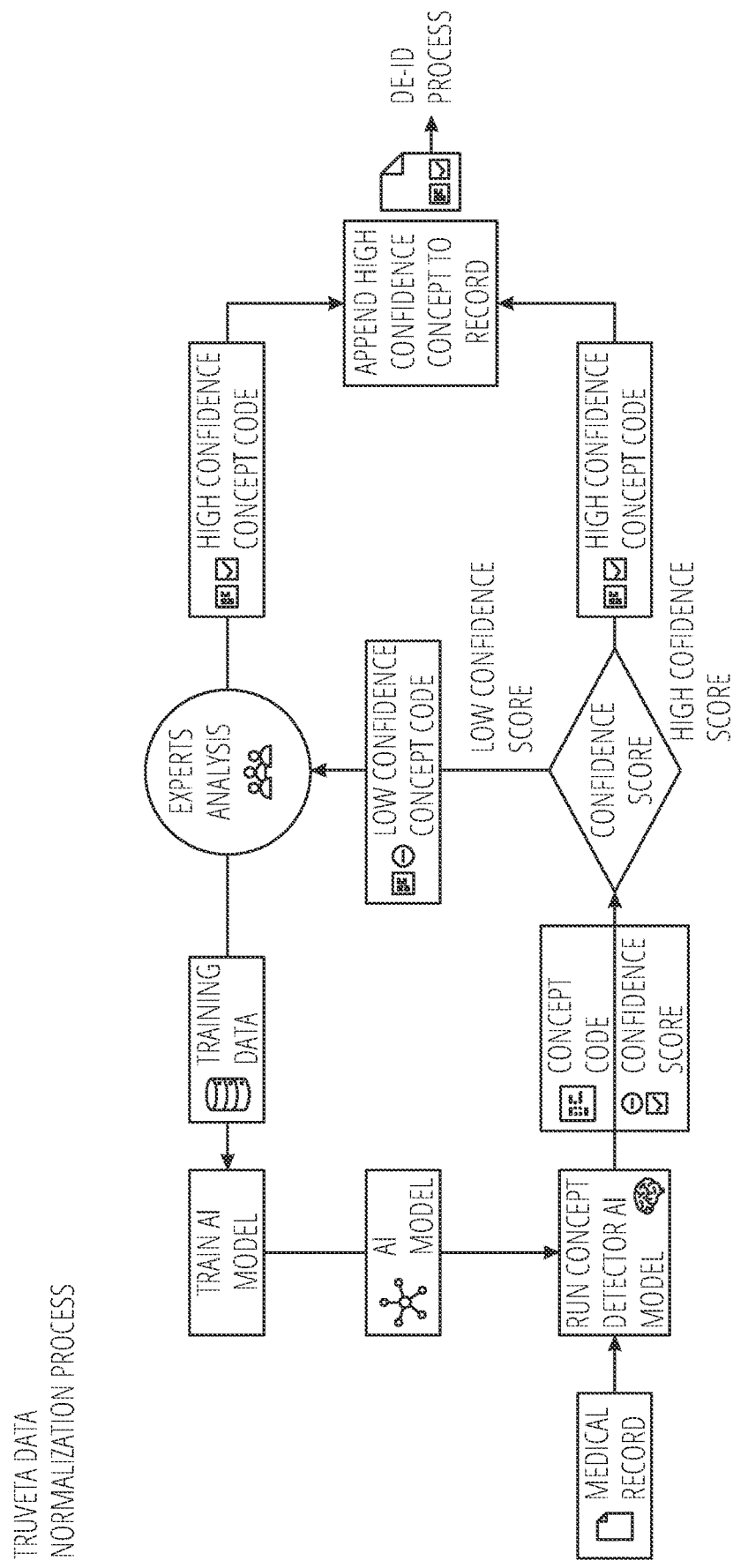
FIG. 3 illustrates a data normalization process, in accordance with embodiments of the present technology.

The system then matches terms in a record to standard terms or "concepts" from the ontologies in the model. This is done through the Concept Detector AI model (FIG. 3). A concept code is generated for each concept along with a related confidence score. This score indicates how closely the model thinks a concept matches the term in the record. In some embodiments, these confidence scores are important to ensuring the accuracy and ongoing evolution of the normalization process.

Figure 4:
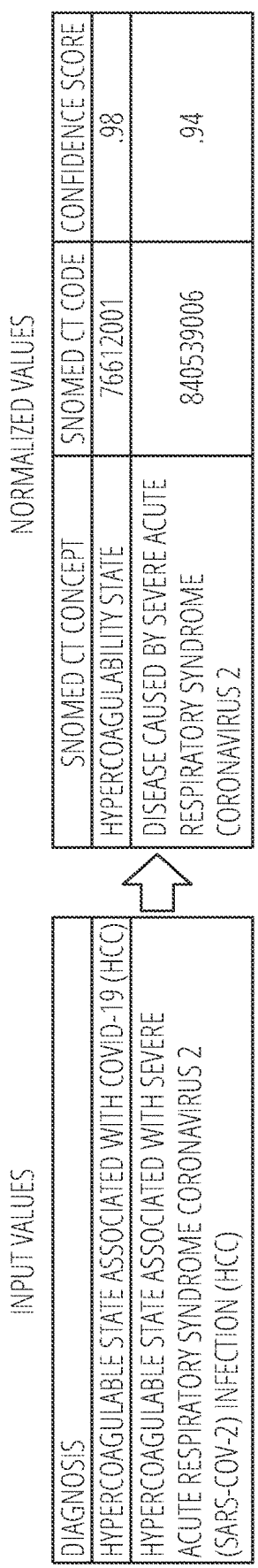
FIG. 4 illustrates an example of mapping diagnoses to standard SNOMED CT concepts, in accordance with embodiments of the present technology.

FIG. 4 illustrates an example in which the system has mapped two diagnoses to two standard SNOMED CT concepts. The system has also generated several confidence scores. These are "high confidence" scores, indicating that the system sees a very close match between the two standard SNOMED concepts and the terms in the record.

With high confidence scores such as these, the related concept codes can be appended to the record and sent through the system for further processing, including de-identification. Concept codes with low confidence scores can take a different path. In these cases, the record and related codes can be sent to a team of annotators and informaticists for review and comparison. The code can be amended, if needed, with a more appropriate concept, added to the record, and sent into the pipeline.

The code can also be used to train AI models. In some embodiments, the training can be done using advanced techniques known as transfer learning—a practice in machine learning that focuses on storing knowledge gained while solving one problem and applying it to a different but related problem.

The system described herein can solve millions of normalization "problems" a day. Using the unique, machine learning models described herein, this can be achieved at ultra-high speed with exceptional accuracy. The result is an effectively normalized data pipeline, ready for research and/or other applications with the very latest data from health system members.

The machine learning system incorporated in the health data platform can be engineered to grow and evolve as quickly as the diversity of the data that it processes. In some embodiments, this includes the use of new and updated ontologies as well as the terms which are added continuously by a team of annotators and informaticists. The result is normalization at a speed and scale unique in the healthcare industry.

Figure 5:
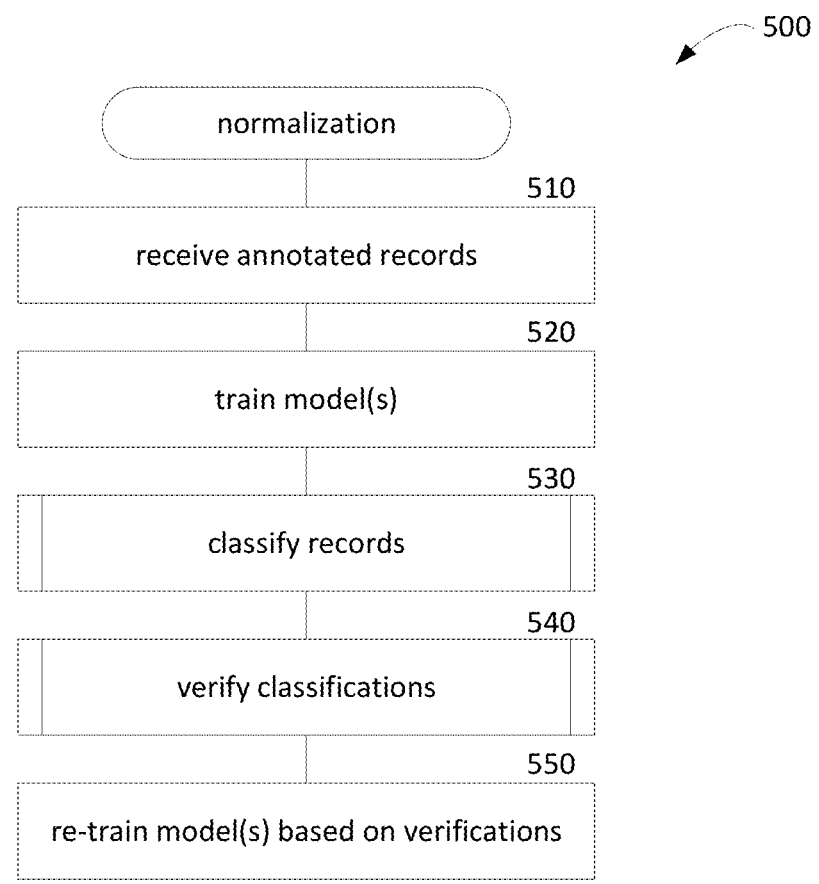
FIG. 5 is block diagram illustrating processing of a normalization component in accordance with some embodiments of the present technology.

FIG. 5 is block diagram illustrating processing of a normalization component in accordance with some embodiments of the present technology. In this example, method 500 normalizes one or more records, such as medical records, using one or more machine learning models trained using a set of annotated medical records by appending, to the records, classification information generated using the one or more machine learning models. In block 510, the normalization component receives annotated records, such as annotated medical records, from one or more sources, such as a repository of annotated records, one or more users or experts in the field of annotated records, and so on. For example, the annotated records may include, for each record, an annotation of one or more concepts or codes associated with the medical record, such as one or more classification codes from a medical ontology. In block 520, the component trains one or more models, such as machine learning models, using the annotated records. For example, the component may train one model for classifying records according to one ontology or set of ontologies (and corresponding records annotated in accordance with those ontologies). As another example, the component may train one or more models according to a set of records that have been annotated with syntactic classifications or fields and further train one or more models according to a set of records that have been annotated with semantic classifications or fields. In this manner, the component can train and apply any number of models for any number of classification or normalization purposes. The machine learning models may be any of a variety or combination of models or classifiers including neural networks such as fully-connected, convolutional, recurrent, autoencoder, or restricted Boltzmann machine, a support vector machine, a Bayesian classifier, and so on. When the machine learning model is a deep neural network, the training results in a set of weights for the activation functions of the deep neural network. A support vector machine operates by finding a hyper-surface in the space of possible inputs. The hyper-surface attempts to split the positive examples (e.g., feature vectors for records associated with a particular condition) from the negative examples (e.g., feature vectors for records that are not associated with the particular condition) by maximizing the distance between the nearest of the positive and negative examples to the hyper-surface. This step allows for correct classification of data that is similar to but not identical to the training data. Various techniques can be used to train a support vector machine.

Adaptive boosting is an iterative process that runs multiple tests on a collection of training data. Adaptive boosting transforms a weak learning algorithm (an algorithm that performs at a level only slightly better than chance) into a strong learning algorithm (an algorithm that displays a low error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier. Adaptive boosting may use weak classifiers that are single-split trees with only two leaf nodes.

A neural network model has three major components: architecture, cost function, and search algorithm. The architecture defines the functional form relating the inputs to the outputs (in terms of network topology, unit connectivity, and activation functions). The search in weight space for a set of weights that minimizes the objective function is the training process. In one embodiment, the classification system may use a radial basis function ("RBF") network and a standard gradient descent as the search technique.

In some embodiments, an AI system may use various design-of-experiments ("DOE") techniques to identify values of feature vectors of consumer entities that result in positive outcomes for various action inducers. Suitable DOE techniques include central composite techniques, Box-Behnken techniques, random techniques, Plackett-Burman techniques, Taguchi techniques, Halton, Faure, and Sobel sequences techniques, Latin hypercube techniques, and so on. (See Cavazzuti, M., "Optimization Methods: From Theory to Design," Springer-Verlag Berlin Heidelberg, 2013, chap. 2, pp. 13-56, which is hereby incorporated by reference in its entirety.) The Latin hypercube technique has the characteristic that it generates sample values in which each axis (i.e., feature) has at most value that is selected.

In block 530, the component invokes a classify records component to apply one or more of the trained models to a set of one or more records, such as medical records that have not been classified. In some cases, after classifying records, the component may apply one or more de-identification techniques, such as those described in U.S. Provisional Patent Application No. 63/263,731, entitled "SYSTEMS AND METHODS FOR DE-IDENTIFYING PATIENT DATA," filed on Nov. 8, 2021, which is herein incorporated by reference in its entirety. In block 540, the component invokes a verify classifications component to assess the quality of the classifications performed by the one or more trained models at block 530. In block 550, the component re-trains the one or more models based on the verified classifications. In this manner, the present technology employs active learning techniques to enable the output of each trained model to inform and improve the training of future iterations of a corresponding model. Accordingly, the models employed by the disclosed system can improve over time based on feedback from the training itself. In response to receiving additional records, the newly trained models can be applied to the additional records (e.g., at block 520) to classify the additional records and further improve the underlying models.

Figure 6:
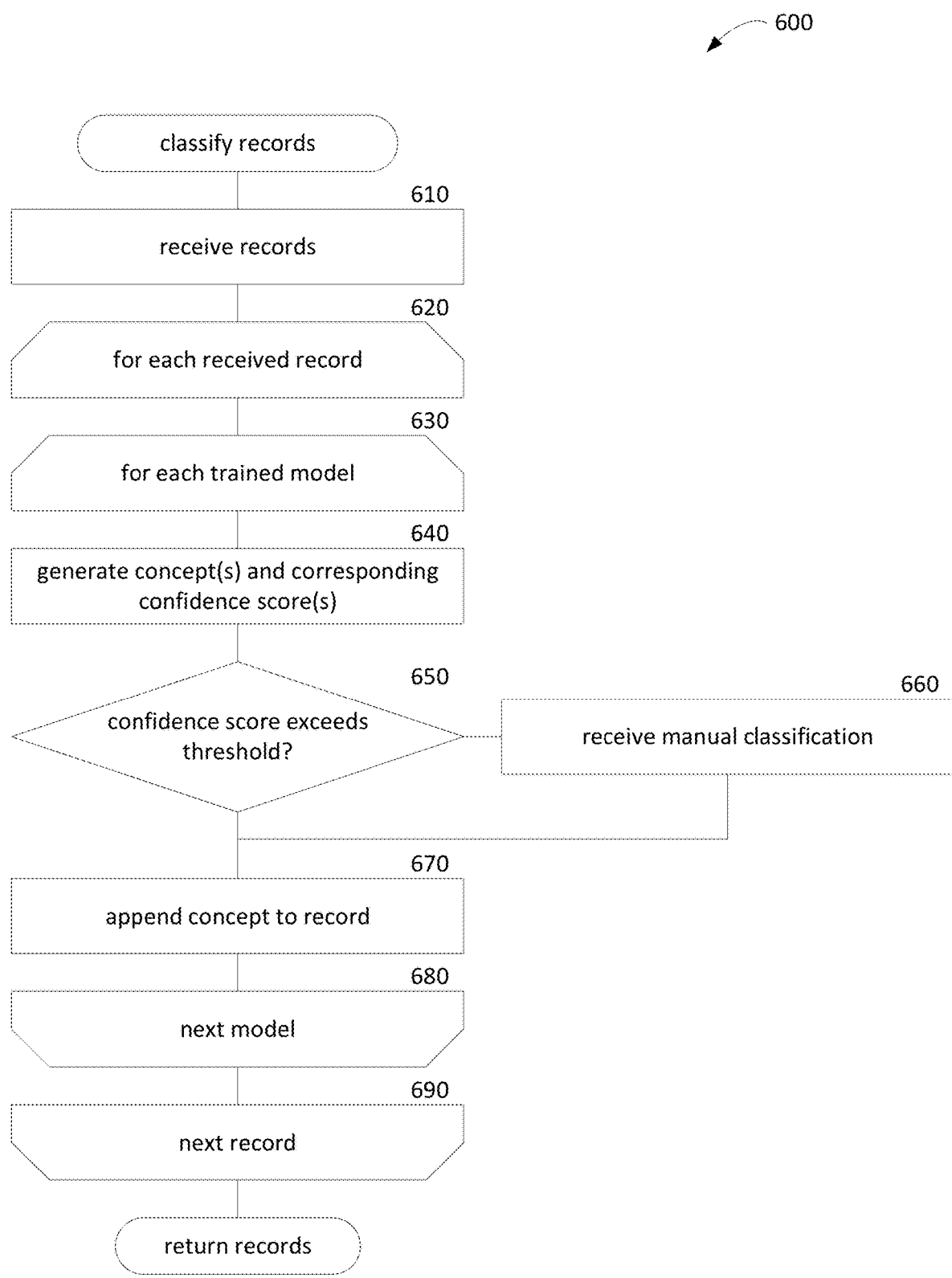
FIG. 6 is a block diagram illustrating processing of a classify records component in accordance with some embodiments of the present technology.

FIG. 6 is a block diagram illustrating processing of a classify records component in accordance with some embodiments of the present technology. In this example, method 600 is invoked by the normalization component and is performed to classify one or more records, such as medical records using one or more models (e.g., machine learning models) trained using a set of annotated medical records. In block 610, the classify records component receives one or more records for classification, such as a set of new or updated medical records. In blocks 620-690, the component loops through each of the records to classify the record according to one or more trained models. In blocks 630-680, the component loops through each of the models to generate concepts and corresponding confidence scores for the currently-selected record. In block 640, the component applies the currently selected trained model to the currently selected record to generate one or more concepts for the record. For example, the component may generate a set of features (feature vector) from the record and apply the model to the feature vector to generate one or more concepts. The component may analyze the record and corresponding metadata to generate one or more values for each of a plurality of attributes, such as patient data attributes, metadata attributes, and so on. For example, the component may apply a metadata transform to one or more records to convert attributes of the records to a feature vector storing values for one or more metadata attributes of the record. Furthermore, the model can specify a confidence score (e.g., 0.1, 0.5, 0.95, 0.99, 1.0) for each generated concept indicating the likelihood that the generated concept is represented in the record. In this manner, each record can be classified according to one or more concepts. In decision block 650, if the confidence score for a particular concept is greater than a threshold (e.g., 0.5, 0.8, 0.95, 0.9875), then the component continues at block 670, else the component continues at block 660. In block 660, the component sends the record to a user or expert for manual classification. In some cases, the component may wait until all concepts have been generated for a particular record before sending the record and corresponding data for manual classification. In some cases, the component may include with the record a list or ranked list of concepts generated for the record. For example, the list of concepts may be ranked according to their corresponding confidences scores. As another example, the concepts may be ranked at a first level based on an accuracy score associated with the model that generated each concept and then ranked according to the confidences scores. In block 670, the component adds the concepts whose confidence scores exceed the threshold (and any manual classifications) to the record. In this manner, the record has been classified and "normalized" using a model trained in accordance with a number of annotated records, such as records annotated according to one or more ontologies. In block 680, if there are any trained models remaining, then the component selects the next trained model and loops back to block 640 to generate one or more concepts and corresponding to confidence scores for the currently selected record using the newly selected model, otherwise the component continues at block 690. In block 690, if there are any records remaining, then the component selects the next record and loops back to block 630 to apply the trained models to the newly selected record, otherwise the component returns an indication of the records to the normalization component. Although described as classifying records according to different concepts, one of ordinary skill in the art will recognize that the trained models may be configured to classify records according to any number of attributes.

Figure 7:
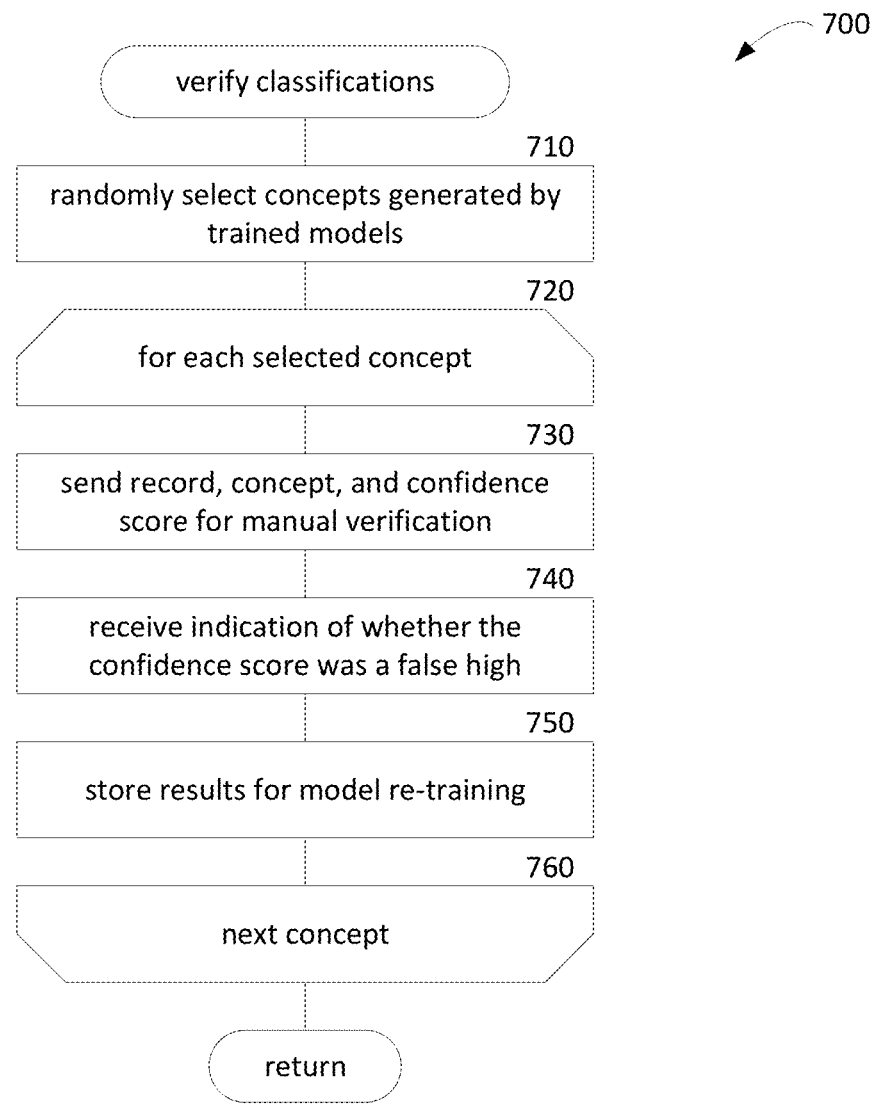
FIG. 7 is a block diagram illustrating processing of a verify classifications component in accordance with some embodiments of the present technology.

FIG. 7 is a block diagram illustrating processing of a verify classifications component in accordance with some embodiments of the present technology. In this example, method 700 is invoked by the normalization component and is performed to verify the accuracy of classifications (e.g., concepts) assigned to records and corresponding confidence scores. In block 710, the component randomly selects concepts generated by the trained models. For example, each time a trained model classifies a record (e.g., generates a concept for a record) with a confidence score that exceeds a predetermined threshold (e.g., 0.5, 0.96, 0.995), the component may generate a random number (e.g., between 0.0 and 1.0) for the concept and if the generated number exceeds a predetermined threshold (e.g., 0.1, 0.5, 0.75), then the concept (and corresponding record/confidence score) can be flagged for verification purposes. In this manner, the randomly selected concepts can be marked for verification, which may occur periodically. One of ordinary skill in the art will recognize that other methods for randomly selecting classifications (e.g., concepts) for verification may be employed. In blocks 720-760, the component loops through each of the randomly selected concepts to assess their quality. In block 730, the components sends an indication (e.g., link or reference) of the currently selected concept and corresponding record and confidence score to a user for a manual assessment. The user, in turn, can analyze the record to determine whether the concept is, in fact, represented in the record. In block 740, the component receives, from the user, an indication of whether the confidence score for the concept was a false high. For example, if the concept was attributed to the record by a trained model but is not represented in the record (according to the user), then the confidence score was a false high). In some cases, the component may request manual assessment from multiple users. In block 750, the component stores the results for use in training subsequent generations of the models. In this manner, the output of each trained model can be used to inform and improve the training of future iterations of the model. Accordingly, the models employed by the disclosed system can improve over time based on feedback from the training itself.

The methods illustrated in FIGS. 5-7 can be modified in many different ways. For example, some or all of the steps of the methods 500, 600, and 700 can be repeated. In some embodiments, the health system provides a dynamic stream or feed of patient records to the health data platform, which may include records for new patients as well as updated records for existing patients. Accordingly, the methods can be repeated (e.g., continuously, at predetermined intervals, when new data is available) to normalize the additional records. Optionally, one or more of the steps of the methods can be omitted (e.g., the suppression process of block 540) and/or the methods can include additional steps not shown. As another example, method 500 may be modified to include one or more additional blocks, such as one or more blocks for automatically generating and transmitting messages to one or more users, such as a health care professional or patient. For example, in response to the health data platform receiving or acquiring new and/or updated records, the health data platform can normalize the new and/or updated records, automatically generate a message containing the new and/or updated records whenever new and/or updated records are received or stored, and transmit the automatically generated message to one or more users over a network in real time, so that those users have immediate access to the new and/or updated patient records.

Conclusion

Although many of the embodiments are described above with respect to systems, devices, and methods for processing patient data and/or other health data, the technology is applicable to other applications and/or other approaches. For example, the present technology can be used in other contexts where data privacy is an important consideration, such as financial records, educational records, political information, location data, and/or other sensitive personal information. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1A-4.

The various processes described herein can be partially or fully implemented using program code including instructions executable by one or more processors of a computing system for implementing specific logical functions or steps in the process. The program code can be stored on any type of computer-readable medium, such as a storage device or storage medium, which includes, for example, a disk or hard drive but does not include transitory computer-readable media. Computer-readable media containing code, or portions of code, can include any appropriate media known in the art, such as non-transitory computer-readable storage media. Computer-readable media can include volatile and non-volatile, removable and non-removable media implemented in any method or technology for storage and/or transmission of information, including, but not limited to, random-access memory (RAM), read-only memory (ROM), electrically erasable programmable read-only memory (EEPROM), flash memory, or other memory technology; compact disc read-only memory (CD-ROM), digital video disc (DVD), or other optical storage; magnetic cassettes, magnetic tape, magnetic disk storage, or other magnetic storage devices; solid state drives (SSD) or other solid state storage devices; or any other medium which can be used to store the desired information and which can be accessed by a system device.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded.

It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method for normalizing medical records, the method comprising:
 receiving a plurality of annotated medical records, each annotated medical record corresponding to a patient;
 training a machine learning model based on the received plurality of annotated medical records;
 receiving a first medical record;

normalizing the first medical record at least in part by applying the trained machine learning model to the received first medical record, wherein applying the trained machine learning model to the received first medical record generates a first concept code for the first medical record, a detection confidence score for the first concept code, a second concept code for the first medical record, and a detection confidence score for the second concept code;

determining that the detection confidence score for the first concept code exceeds a first predetermined threshold;

after determining that the detection confidence score for the first concept code exceeds the first predetermined threshold, appending the first concept code to the first medical record so that the first medical record includes the first concept code;

determining that the detection confidence score for the second concept code does not exceed a second predetermined threshold;

after determining that the detection confidence score for the second concept code does not exceed the second predetermined threshold, ranking the second concept code relative to one or more other concept codes; and receiving, from a user, a selection of one or more of the ranked concept codes.

2. The method of claim 1, wherein applying the trained machine learning model to the received first medical record generates a plurality of concept codes for the first medical record and a detection confidence score for each generated concept code.

3. The method of claim 2, further comprising:
randomly selecting one or more of the generated concept codes;
for each of the randomly selected one or more generated concept codes,
receiving, from a user, an indication of whether the generated concept code has a false high confidence score; and
re-training the machine learning model based on one or more of the received indications.

4. The method of claim 1, further comprising:
in response to determining that the detection confidence score for the first concept code exceeds a first threshold, inserting the first concept code into the first medical record.

5. The method of claim 1, further comprising:
inserting the selected one or more ranked concept codes into the first medical record.

6. The method of claim 1, wherein applying the trained machine learning model to the first medical record comprises generating a feature vector for the first medical record, the feature vector comprising a value for each of a plurality of attributes.

7. The method of claim 6, wherein the feature vector for the first medical record includes at least one value for a metadata attribute of the first medical record.

8. The method of claim 1, further comprising:
providing remote access to users over a network so that any one or more of the users can provide at least one updated record in real time through an interface, wherein at least one of the users provides an updated record in a format other than a common format, wherein the format other than the common format is dependent on hardware and software platform used by the at least one user;
converting the at least one updated record into the common format;
generating a set of at least one normalized record from the at least one updated record;
storing the generated set of at least one normalized record;
after storing the generated set of at least one normalized record, generating a message containing the generated set of at least one normalized record; and
transmitting the message to one or more users over the network in real time, so that the users have access to the updated record.

9. The method of claim 1, further comprising:
de-identifying each of the plurality of annotated medical records and the first medical record.

10. The method of claim 1, wherein each of the annotated medical record includes a number of fields and a corresponding annotation, the corresponding annotation representing a field from a common schema model, the method further comprising:
training a second machine learning model based on the received plurality of annotated medical records, wherein the trained second machine learning model is configured to identify at least one field from the common schema model for each of a plurality of fields associated with an input medical record;
further normalizing the first medical record at least in part by applying the trained second machine learning model to the received first medical record, wherein applying the trained second machine learning model to the received first medical record identifies, for each of a plurality of fields associated with the first medical record, at least one field of the common schema model associated with the field associated with the first medical record; and
appending each identified field of the common schema model to the first medical record.

11. A computing system for normalizing records, the computing system comprising:
at least one memory;
at least one processor;
a component configured to train a plurality of machine learning models based on a first plurality of annotated records;
a component configured to, for each of a second plurality of records, apply one or more of the plurality of machine learning models to the record, wherein applying each trained machine learning model to the record generates a code for the record and a corresponding confidence score;
a component configured to determine whether a first confidence score for a first code, generated by applying a first machine learning model of the plurality of machine learning models to a first record of the second plurality of records, exceeds a predetermined threshold;
a component configured to, after determining that the confidence score for the first code exceeds the predetermined threshold, append the first code to the first record so that the first record includes the first code; and
a component configured to, after determining that a confidence score for a second code does not exceed the predetermined threshold, rank the second code relative to one or more other codes; and
a component configured to receive, from a user, a selection of one or more of the ranked codes,
wherein each of the components comprises computer-executable instructions stored in the at least one memory for execution by the computing system.

12. The computing system of claim 11, wherein one or more of the annotated records is annotated with one or more syntactic classifications, each syntactic classification having an associated code.

13. The computing system of claim 11, further comprising:
a component configured to rank a plurality of classifications generated for the first record based on the confidence score associated with each of the plurality of classifications.

14. The computing system of claim 11, further comprising:
a component configured to identify at least one ontology associated with a first annotated record of the first plurality of annotated records.

15. The computing system of claim 11, further comprising:
a component configured to, for each of a plurality of metadata attributes associated with the first record, determine a value for the metadata attribute; and
a component configured to apply one or more trained models to the determined values.

16. A computer-readable storage medium storing instructions that, when executed by a computing system having a memory and a processor, cause the computing system to perform a method for normalizing data, the method comprising:
training a machine learning model based on a plurality of annotated records, each annotated record specifying at least one associated classification;
receiving a new record;
normalizing the new record at least in part by applying the trained machine learning model to the received new record, wherein applying the trained machine learning model to the new record generates a first classification for the new record, a confidence score for the first classification, a second classification for the new record, and a confidence score for the second classification;
determining that the confidence score for the first classification exceeds a predetermined threshold;
after determining that the confidence score for the first classification exceeds the predetermined threshold, appending the first classification to the new record so that the new record includes the first classification;
determining that the confidence score for the second classification does not exceed the predetermined threshold;
after determining that the confidence score for the second classification does not exceed the predetermined threshold, ranking the second classification relative to one or more other classifications; and
receiving, from a user, a selection of one or more of the ranked classifications.

17. The computer-readable storage medium of claim 16, wherein one or more of the annotated records is annotated with one or more semantic classifications, each semantic classification having an associated code.

18. The computer-readable storage medium of claim 16, the method further comprising:
for each of a plurality of classifications generated for a first record,
determining whether a confidence score associated with the classification exceeds the predetermined threshold, and
in response to determining that the confidence score associated with the classification exceeds the predetermined threshold, adding the classification to the first record.

19. The computer-readable storage medium of claim 16, the method further comprising:
randomly selecting one or more classifications associated with a first record; and
for each of the randomly selected one or more classifications,
receiving, from a user, an indication of whether the classification has a false high confidence score.

20. The computer-readable storage medium of claim 19, the method further comprising:
re-training at least one machine learning model based on one or more of the received indications.

* * * * *